(12) United States Patent
Chen et al.

(10) Patent No.: US 7,216,140 B1
(45) Date of Patent: May 8, 2007

(54) EFFICIENT IMPLEMENTATION OF N-POINT DCT, N-POINT IDCT, SA-DCT AND SA-IDCT ALGORITHMS

(75) Inventors: Yen-Kuang Chen, Franklin Park, NJ (US); Nicholas H. Yu, Wexford, PA (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 09/676,556

(22) Filed: Sep. 30, 2000

(51) Int. Cl.
*G06F 7/52* (2006.01)

(52) U.S. Cl. .................................................. 708/607

(58) Field of Classification Search ........ 708/400–409, 708/622, 322, 603, 607, 620; 348/404.1; 325/240.02
See application file for complete search history.

(56) References Cited

U.S. PATENT DOCUMENTS

| | | | | |
|---|---|---|---|---|
| 5,325,215 | A * | 6/1994 | Shibata et al. | 708/520 |
| 5,422,836 | A * | 6/1995 | Beichter et al. | 708/520 |
| 5,522,085 | A * | 5/1996 | Harrison et al. | 708/525 |
| 5,610,849 | A * | 3/1997 | Huang | 708/401 |
| 5,621,674 | A * | 4/1997 | Gray et al. | 708/203 |
| 5,724,278 | A * | 3/1998 | Ohgose et al. | 708/401 |
| 5,764,787 | A * | 6/1998 | Nickerson | 382/107 |
| 5,983,257 | A * | 11/1999 | Dulong et al. | 708/603 |
| 5,990,956 | A * | 11/1999 | Lee | 348/404.1 |
| 6,006,246 | A * | 12/1999 | Ohki | 708/607 |
| 6,058,408 | A * | 5/2000 | Fischer et al. | 708/322 |
| 6,237,016 | B1 * | 5/2001 | Fischer et al. | 708/622 |
| 6,243,730 | B1 * | 6/2001 | Wang | 708/401 |
| 6,408,025 | B1 * | 6/2002 | Kaup | 375/240.02 |
| 6,490,607 | B1 * | 12/2002 | Oberman | 708/620 |
| 6,535,946 | B1 * | 3/2003 | Bryant et al. | 710/305 |
| 6,687,724 | B1 * | 2/2004 | Mogi et al. | 708/490 |

OTHER PUBLICATIONS

Andre Kaup, Object-based Texture coding of moving video in MPEG-4, 1999, IEEE transactions on circuits and systems for video technology vol. 9, No. 1, p. 5-15.*

Thuyen Le et al., A new flexible architecture for variable length DCT targeting shape-adaptive transform, 1999, IEEE, p. 1949-1952.*

William Smith, Subword extensions for video processing on mobile systems, Sep. 1998, IEEE mobile computing, pp. 13-16.*

(Continued)

*Primary Examiner*—Meng-Al T. An
*Assistant Examiner*—Chat C. Do
(74) *Attorney, Agent, or Firm*—Blakely, Sokoloff, Taylor & Zafman LLP

(57) ABSTRACT

An efficient implementation of n-point discrete cosine transform, n-point inverse discrete cosine transform, shape adaptive discrete cosine transform and shape adaptive inverse discrete cosine transform algorithms for multimedia compression and decompression optimization. An n-point DCT function is represented by a first equation having an input matrix, an output matrix and a matrix of predetermined values. An n-point IDCT function is represented by a second equation having an input matrix, an output matrix and a matrix of predetermined values. The multiplication operations within the matrix of predetermined values are paired, thereby reducing processor instructions. SIMD operations, MMX operations, VLSI implementation, single processor implementation, and vector processing are used to perform the algorithms.

15 Claims, 7 Drawing Sheets

$$\begin{bmatrix} y_1 \\ y_2 \\ \vdots \\ y_n \end{bmatrix} = \begin{bmatrix} S_{11} & \cdots & S_{1n} \\ \vdots & & \vdots \\ S_{n1} & \cdots & S_{nn} \end{bmatrix} \begin{bmatrix} M_{11} & M_{12} & \cdots & M_{1n} \\ \vdots & & & \vdots \\ M_{n1} & & \cdots & M_{nn} \end{bmatrix} \begin{bmatrix} B_{11} & \cdots & B_{1n} \\ \vdots & & \vdots \\ B_{n1} & \cdots & B_{nn} \end{bmatrix} \begin{bmatrix} x_1 \\ x_2 \\ \vdots \\ x_n \end{bmatrix}$$

922     924     925

OTHER PUBLICATIONS

Yonghon et al., Integer sinusoidal transforms based on lifting factorization, 2001, IEEE, pp. 1181-1184.*

Yonghong et al., Integer DCTs and Fast algorithms, Nov. 2001, IEEE Transactions on signal processing, vol. 49, No. 11, pp. 2774-2782.*

Chen, Wen-Hsiung, et al., A Fast Computational Algorithm for the Discrete Cosine Transform, IEEE Transactions On Communications, vol. Com-25, No. 3, Sep. 1977, pp. 1004-1009.

Kauff, Peter et al., Experimental Results on a Fast SA-DCT Implementation, International Organisation For Standardisation Organisation Internationale De Normalisation ISO/IEC/JTC1/SC29/WG11 Coding Of Moving Pictures And Audio, ISO/IECJTC1/SC29/2G11N, MPEG 98/3569, Dublin, Jul. 1998, pp. 1-10.

Owzar, M., et al., Evaluation of SA-DCT Hardware Complexity, International Organisation For Standardisation Organisation Internationale De Normalisation ISO/IEC/JTC1/SC29/WG11 Coding Of Moving Pictures And Audio, ISO/IECJTC1/SC29/WG11MPEG 99/4407 Seoul, Mar. 1999, 9 pages.

No Author, Using MMX™ Instructions in a Fast iDCT Algorithm for MPEG Decoding, Application Note AP-528, MMX™ Technology Application Notes, http://developer.intel.com/drg/mmx/appnotes/ap528.htm, Apr. 28, 2000, pp. 1-21.

No Author., Using Streaming SIMD Extensions in a Fast DCT Algorithm for MPEG Encoding, Version 1.2, Jan. 1999, Order No.: 243651-002, Feb. 4, 1999, Copyright © Intel Corporation 1998, 1999, cover pages—p. 7.

H. Fassbender, "The Parameterized SR Algorithm for Symplectic (Butterfly) Matrices", *Mathematics of Computation*, vol. 70, No. 236, 2000, p. 1515-1541.

* cited by examiner $$\begin{bmatrix} y_1 \\ y_2 \\ \vdots \\ y_n \end{bmatrix} = \begin{bmatrix} A_{11} & A_{12} & \cdots & A_{1n} \\ \vdots & & & \vdots \\ A_{n1} & \cdots & & A_{nn} \end{bmatrix} \begin{bmatrix} x_1 \\ x_2 \\ \vdots \\ x_n \end{bmatrix}$$

910　920　930

One embodiment of n-point DCT/IDCT

FIG. 9A

$$\begin{bmatrix} y_1 \\ y_2 \\ \vdots \\ y_n \end{bmatrix} = \begin{bmatrix} S_{11} & \cdots & S_{1n} \\ \vdots & & \vdots \\ S_{n1} & \cdots & S_{nn} \end{bmatrix} \begin{bmatrix} M_{11} & M_{12} & \cdots & M_{1n} \\ \vdots & & & \vdots \\ M_{n1} & & & M_{nn} \end{bmatrix} \begin{bmatrix} B_{11} & \cdots & B_{1n} \\ \vdots & & \vdots \\ B_{n1} & \cdots & B_{nn} \end{bmatrix} \begin{bmatrix} x_1 \\ x_2 \\ \vdots \\ x_n \end{bmatrix}$$

EFFICIENT IMPLEMENTATION OF N-POINT DCT, N-POINT IDCT, SA-DCT AND SA-IDCT ALGORITHMS

FIELD

This invention relates to an implementation of algorithms for multimedia compression and decompression, more particularly, efficient implementation of n-point discrete cosine transform, n-point inverse discrete cosine transform, shape adaptive discrete cosine transform, and shape adaptive inverse discrete cosine transform algorithms using SIMD operations, MMX™ instructions, VLSI implementation, single processor implementation or vector processing.

BACKGROUND

Computer multimedia applications typically involve the processing of high volumes of data values representing audio signals and video images. Processing the multimedia data often includes performing transform coding which is a method of converting the data values into a series of transform coefficients for more efficient transmission, computation, encoding, compression, or other processing algorithms.

More specifically, the multimedia data values often represent a signal as a function of time. Transform coefficients represent the same signal as a function, for example, of frequency. There are numerous transform algorithms, including the fast Fourier transform (FFT), the discrete cosine transform (DCT), and the Z transform. Corresponding inverse transform algorithms, such as an inverse discrete cosine transform (iDCT), convert transform coefficients to sample data values. Many of these algorithms include multiple mathematical steps that involve decimal numbers.

In an effort to allow for easy interchange of graphical formats, the International Standards Organization (ISO) and the Consultative Committee for International Telegraph and Telephone (CCITT) formed the Joint Photographic Experts Group (JPEG) and the Moving Pictures Expert Group (MPEG). The JPEG/MPEG committee published compression standards that use the Discrete Cosine Transform (DCT) algorithm to convert a graphics image to the frequency domain. Efficient implementations of the DCT algorithm is an interest since JPEG and MPEG algorithms strive to achieve real-time performance. Most multimedia development software that uses this type of compression depend on the use of a coprocessor to generate compression.

DCT is widely used in one dimensional (1D) and two dimensional (2D) signal processing. 2D 8×8 DCT is the basis for JPEG and MPEG compression. While there are presently algorithms that directly compute 2D 8×8 DCT, taking the 8-point 1D transform of the rows and the columns is equivalent to the 2D 8×8 transform. There exists algorithms that compute 1D 8-point DCT which can be used in the row-column method to perform a 2D 8×8 DCT.

BRIEF DESCRIPTION OF THE DRAWINGS

Additional advantages of the invention will become apparent upon reading the following detailed description and upon reference to the drawings, in which:

FIG. 9a depicts one embodiment of n-point DCT/IDCT;

FIG. 9b depicts a factored embodiment of n-point DCT/IDCT.

DETAILED DESCRIPTION

Exemplary embodiments are described with reference to specific configurations. Those skilled in the art will appreciate that various changes and modifications can be made while remaining within the scope of the claims.

Multimedia extension (MMX™) is used to implement SIMD operations. Existing algorithms do not reduce the clock cycle count of the implementation in MMX™ although they minimize the number of addition and multiplication operations. In another embodiment, the PMADDWD instruction used in existing algorithms multiplies and adds, making it unworkable to obtain four discrete 32-bit values from four sets of 16-bit multiplies. The present invention reduces processor time by having operations done with minimal PMADDWD instructions.

The invention provides an efficient implementation of n-point discrete cosine transform, n-point inverse discrete cosine transform, shape adaptive discrete cosine transform (SA-DCT) and shape adaptive inverse discrete cosine transform (SA-IDCT) algorithms for multimedia compression and decompression optimization. An n-point DCT function is represented by a first equation having an input matrix, an output matrix and a matrix of predetermined values. An n-point IDCT function is represented by a second equation having an input matrix, an output matrix and a matrix of predetermined values. The multiplication operations within the matrix of predetermined values are paired, thereby reducing processor instructions. In another embodiment, SIMD operations are used to perform the algorithms. In another embodiment, MMX operations being one type of SIMD operations is used to perform the algorithms. In another embodiment, vector processing is used to perform the algorithms. In another embodiment, single processor implementation is used to perform the algorithms. In yet another embodiment VLSI implementation is used to perform the algorithms.

In an embodiment, a machine readable storage medium having executable instructions which, when executed by a processor, implements n-point discrete cosine transform (n-point DCT) algorithms, n-point inverse discrete cosine transform (n-point IDCT) algorithms, shape adaptive dis crete cosine transform (SA-DCT) algorithms and shape adaptive inverse discrete cosine transform (SA-IDCT) algorithms for multimedia compression and decompression is provided. A machine-readable storage medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 1:
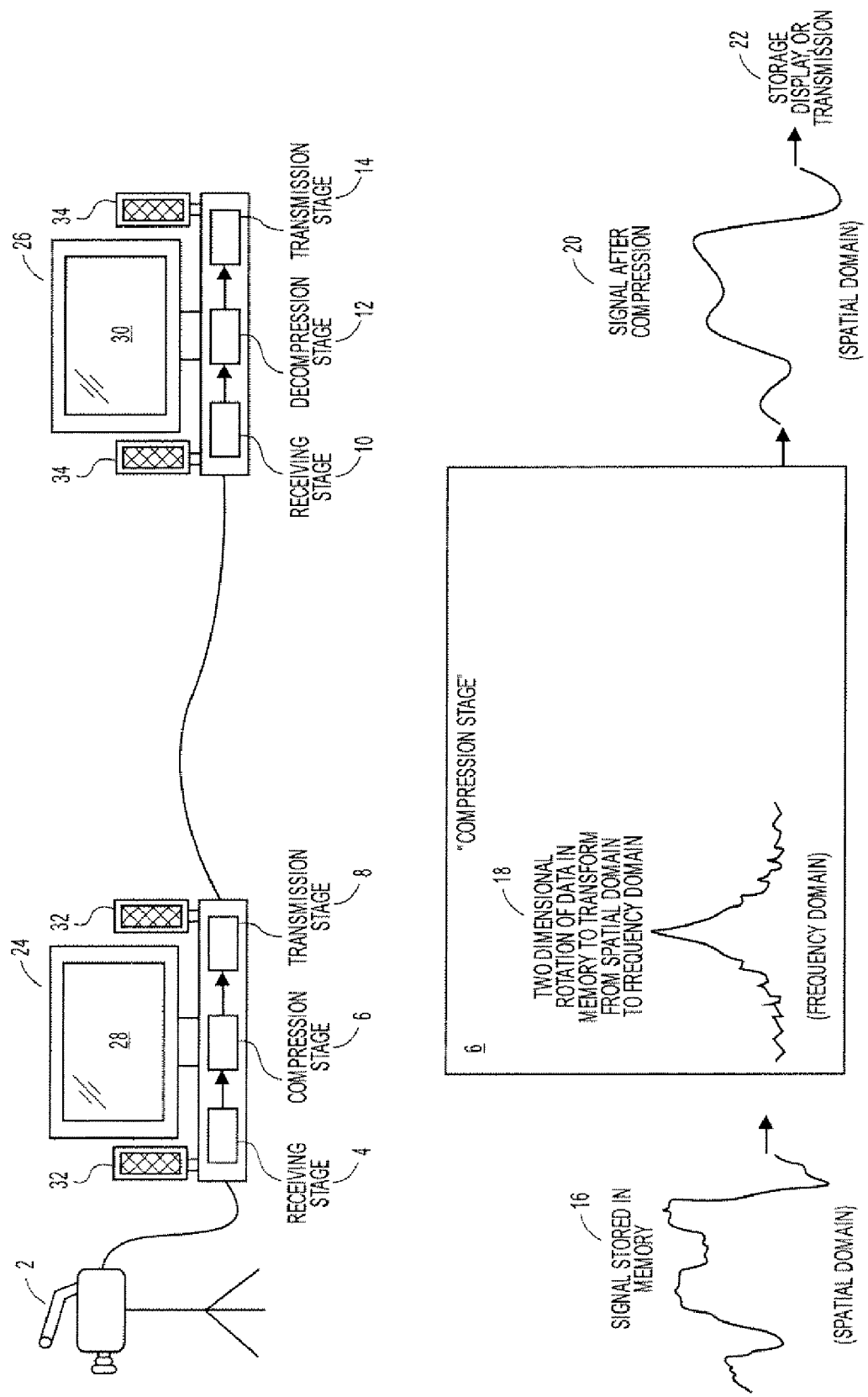
FIG. 1 is a block diagram depicting multimedia compression and decompression, in another embodiment of the present invention.

In another embodiment, once the video signal has been stored as data in the computer system memory, the data is manipulated at compression stage 6, which may include compressing the data into a smaller memory space. In FIG. 1, at stage 6, by occupying a smaller memory space, the video signal is more easily stored or transmitted because there is less data to store or transmit, requiring less processing power and system resources. Video signal 16, stored in memory registers of the computer system, is directed to compression stage 6. In the spatial domain, video signal 16 is represented by a waveform in which the amplitude of the signal is indicated by vertical displacement while time or space is indicated by horizontal displacement.

For many compression methods it is desirable to transform a signal from the spatial domain to another domain, such as the frequency domain, before analyzing or modifying the signal. After video signal 16 is received at compression stage 6, the signal is transformed from the spatial domain to the frequency domain. In the frequency domain, the amplitude of a particular frequency component (e.g. a sine or cosine wave) of the original signal is indicated by vertical displacement while the frequency of each frequency component of the original signal is indicated by horizontal displacement. The video waveform 16 is illustrated in the frequency domain at step 18 within compression stage 6.

In another embodiment, transformation of a signal from the spatial to the frequency domain involves performing a Discrete Cosine Transform of the data elements representing the signal. For example, in accordance with some JPEG and MPEG standards, square subregions of the video image, generally an 8×8 array of pixels, are transformed from the spatial domain to the frequency domain using a discrete cosine transform function. This 8×8 array of pixels corresponds to 8×8 data elements, each data element corresponding to the value (e.g. color, brightness, etc.) of its associated pixel in the 8×8 array. For another embodiment, other transform functions are implemented such as, for example, a Fourier transform, a fast Fourier transform, a fast Hartley transform, or a wavelet transform.

In another embodiment of the present invention, the signal is reconverted back into the spatial domain by applying an inverse transform to the data. Alternatively, the signal remains in the frequency domain and is transformed back into the spatial domain during the decompression stage, as described below.

Upon receiving the compressed video signal at receiving stage 10, the data associated with the signal is loaded into computer system memory. In addition, if the video signal is encrypted, it is decrypted here. At decompression stage 12, the signal is decompressed by a method including, for example, applying an inverse transform to the data to translate the signal back into the spatial domain. This assumes the signal has been transmitted in a compressed format in the frequency domain from computer system 24. For an embodiment in which the compressed video signal is transmitted in the spatial domain, application of an inverse transform during the decompression stage may not be necessary. However, decompression of a video signal may be more easily accomplished in the frequency domain, requiring a spatial domain signal received by decompression stage 12 to be transformed into the frequency domain for decompression, then back into the spatial domain for display.

Once decompressed, the signal is transferred to display stage 14, which may comprise a video RAM (VRAM) array, and the image is displayed on display device 30. Using this technique, a user at computer system 24 can transmit a video image to computer system 26 for viewing at the second computer terminal. Similarly, computer system 26 may have similar video and audio transmission capabilities (not shown), allowing display and audio playback on display device 28 and speakers 32, respectively, of computer system 24. In this manner, applications such as video conferencing are enabled.

Figure 4:
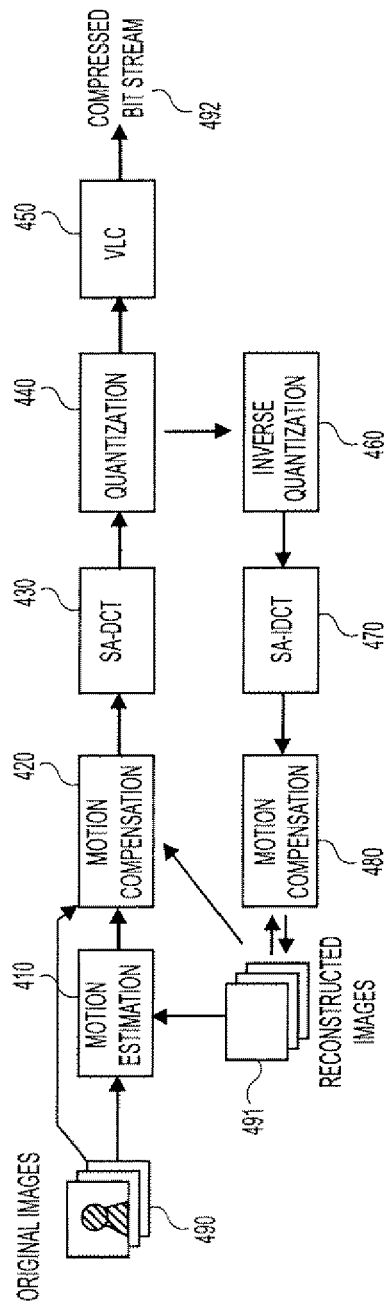
FIG. 4 depicts one embodiment of video compression.

As shown in FIG. 4, SA-DCT can be used in one embodiment of video compression devices 490. Motion estimation 410 and motion compensation 420 can remove the temporal redundancy in the pictures. SA-DCT 430 can remove the spatial redundancy by transforming "time-domain" information into "frequency-domain" information with help from Quantization 440. Variable Length Encoder (VLC) 450 compresses the frequency-domain data into bits. Inverse Quantization 460, SA-IDCT 470, and motion compensation 480 are used to improve the encoding quality.

Figure 5:
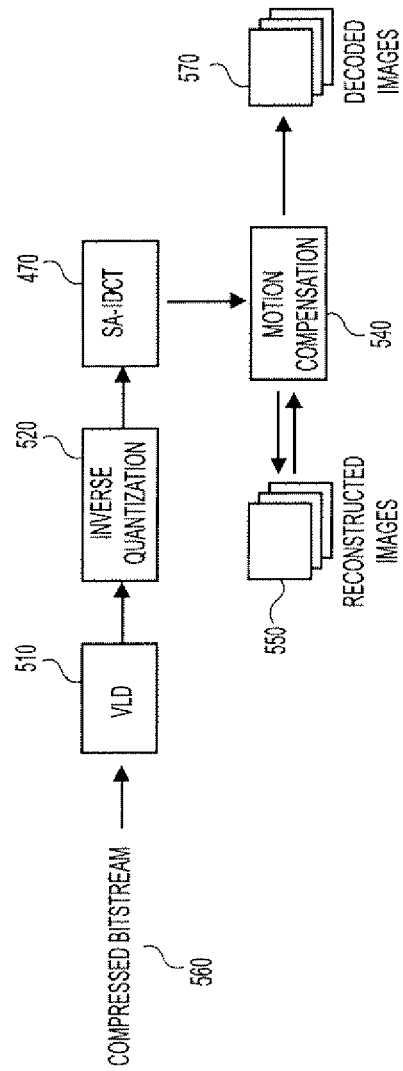
FIG. 5 depicts one embodiment of video decompression.

As shown in FIG. 5, SA-IDCT can be used in one embodiment of video decompression devices 560. VLD 510 and Inverse Quantization 520 reverse bits into frequency-domain data. SA-IDCT 470 reverses the frequency-domain data into spatial domain data. Motion compensation 540 reconstructs the images 550 and 570.

Figure 3E:
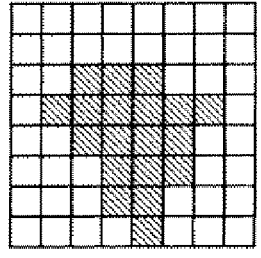
FIGS. 3a–3e depicts the SA-DCT baseline algorithm for coding an arbitrarily shaped image segment contained within an 8×8 block, in another embodiment of the present invention.
Figure 3D:
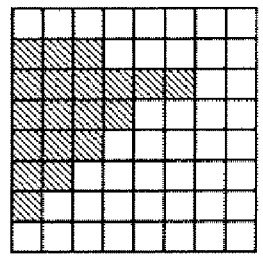
Figure 3C:
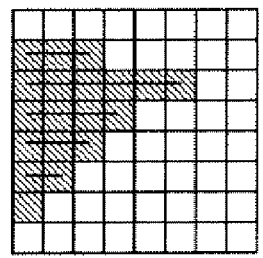
Figure 3B:
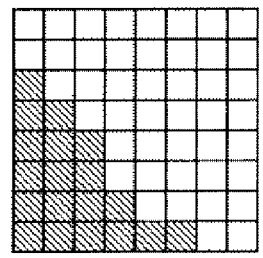
Figure 6:
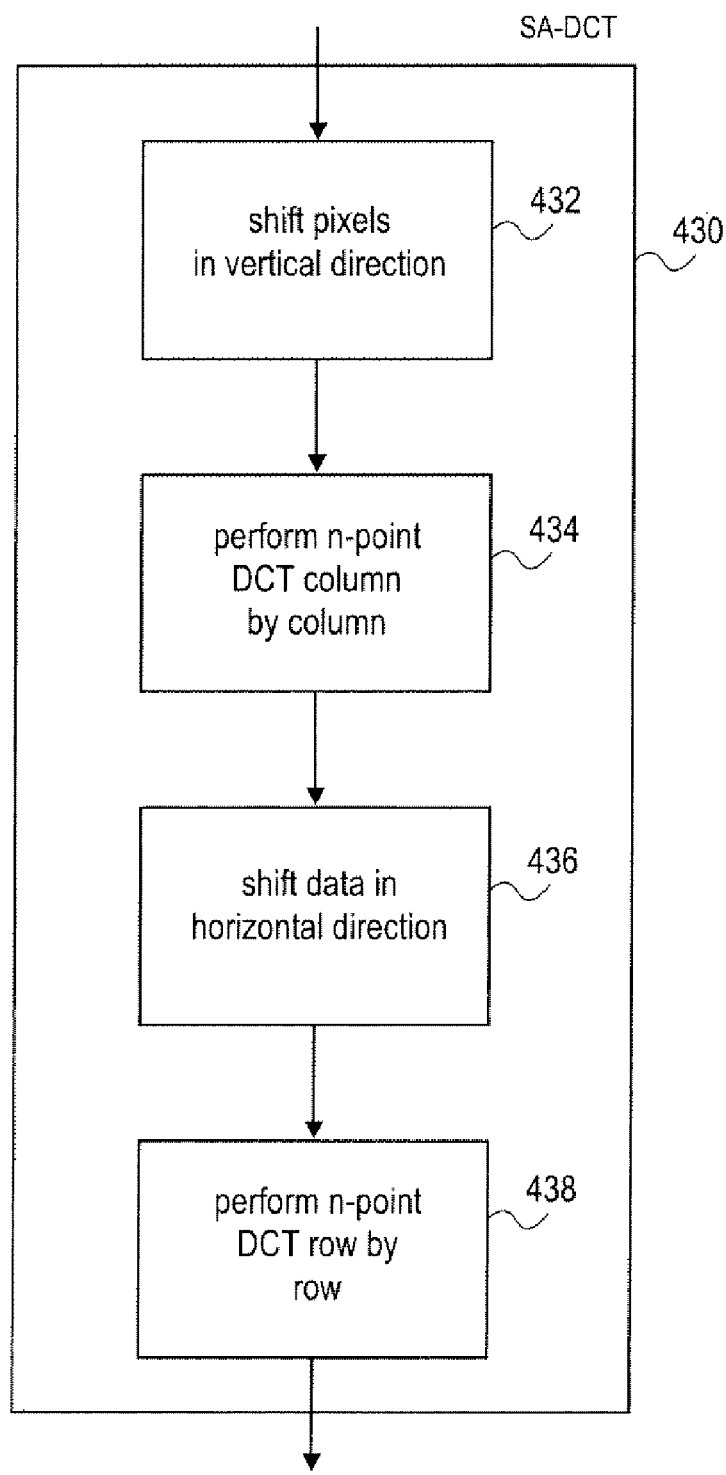
FIG. 6 depicts one embodiment of SA-DCT.

As shown in FIG. 6, n-point DCT can be used in one embodiment of SA-DCT 430. First, the data is shifted in the vertical direction 432 (FIG. 3b). Second, n-point DCT is performed column by column 434 (FIG. 3c). The data is shifted in the horizontal direction 436 (FIG. 3d). As shown in FIG. 3e, n-point DCT is performed row by row 438.

Figure 7:
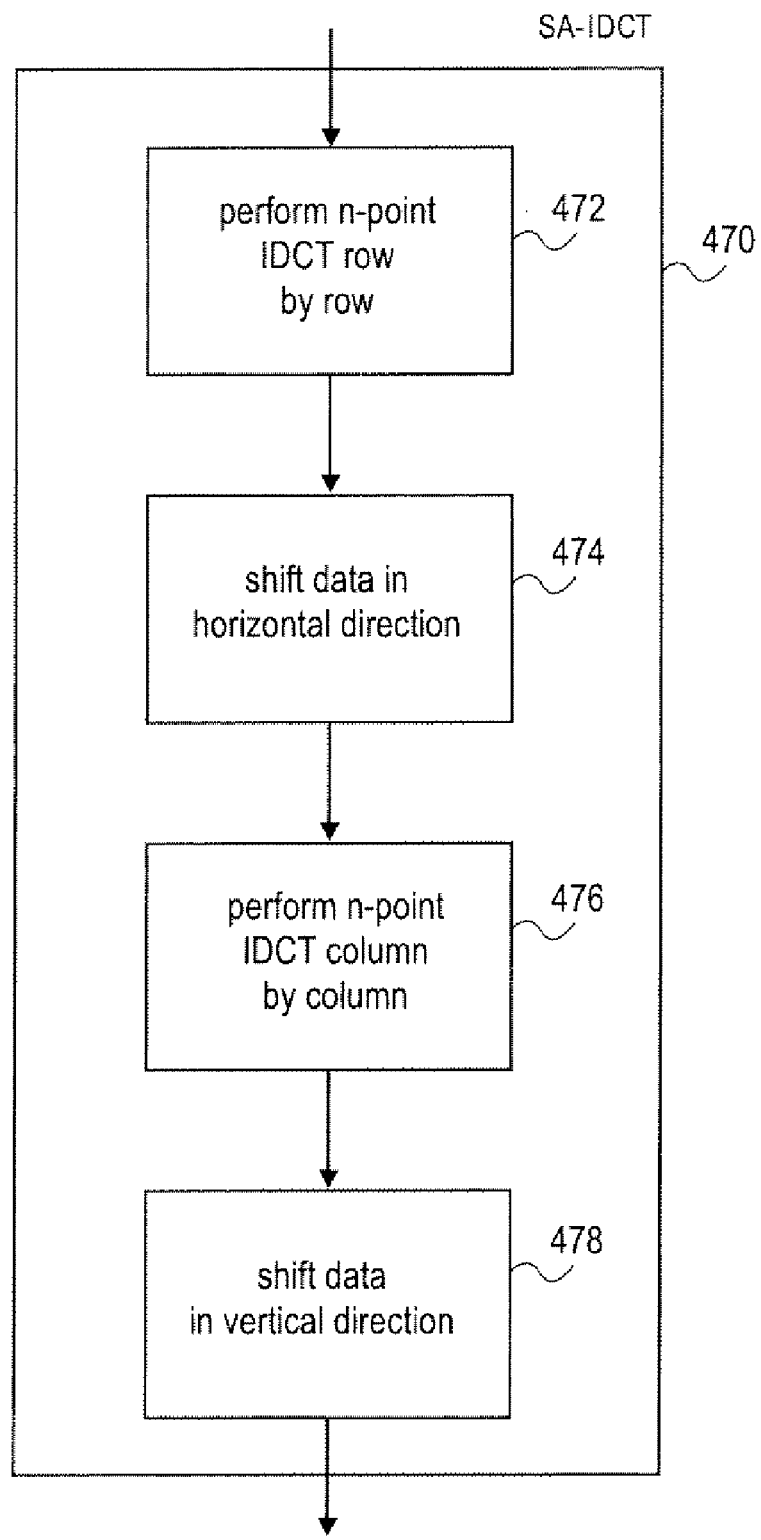
FIG. 7 depicts one embodiment of SA-IDCT.

As shown in FIG. 7, n-point IDCT can be used in one embodiment of SA-IDCT 470. N-point DCT is performed row by row 472. Data is shifted in the horizontal direction 474. N-point DCT is performed column by column 476. The data is shifted in the vertical direction 478.

Figure 8:
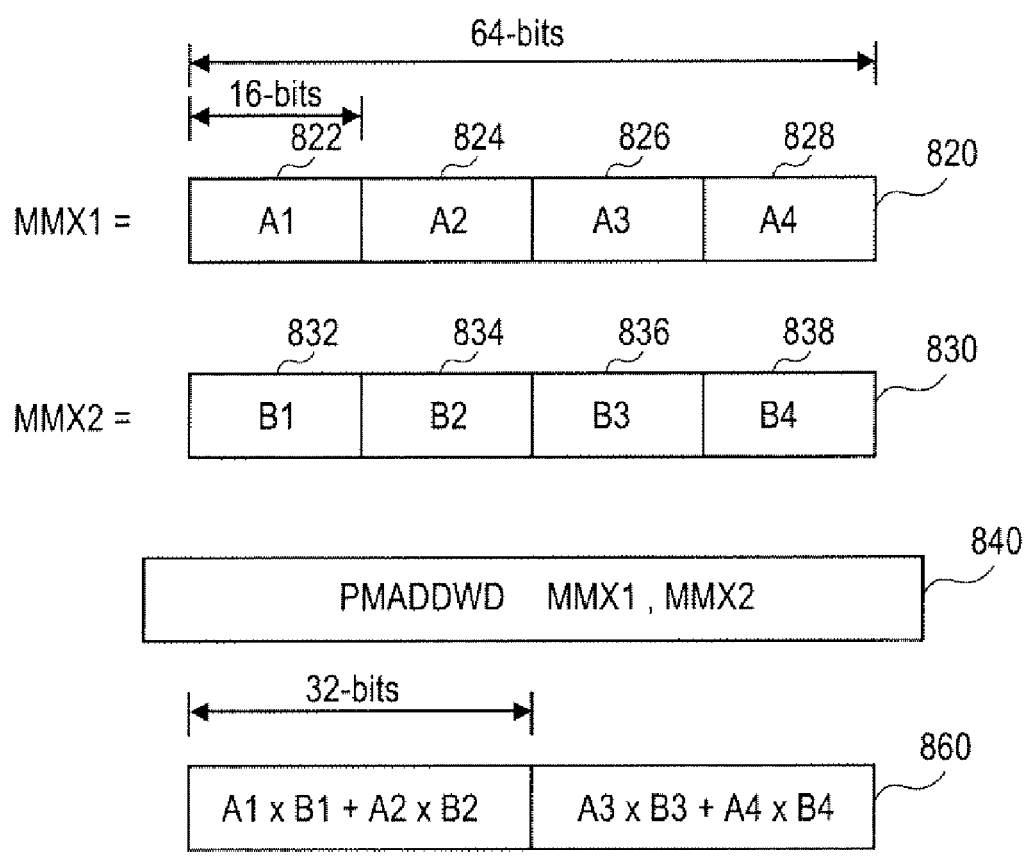
FIG. 8 depicts one embodiment of Single Instruction-Multiple-Data (SIMD)

As shown in FIG. 8, SIMD uses single instruction to operate on multiple data. 64-bit data 820 contains 16-bit data 822, 824, 826, and 828. 64-bit data 840 contains 16-bit data 842, 844, 846, and 848. PMADDWD is used (one of the MMX instructions which is one type of SIMD instructions) to add the multiplication result of 822 and 832 and the multiplication result of 824 and 834 as well to add the multiplication result of 826 and 836 and the multiplication result of 828 and 838.

As shown in FIG. 9, matrix multiplication can be used for n-point DCT/IDCT 434, 438, 472, and 478. For n-point DCT, input [X] is the frequency-domain data 930 and output

[Y] is the time-domain data 910. In one embodiment, matrix [A] is factored into [S][M][B], where the number of multiplications is reduced. An embodiment of this invention is to use SIMD operation for n-point DCT/IDCT. As applied to DCT, matrix 910 represents frequency domain data, and matrix 930 represents time domain data. As applied to IDCT, matrix 910 represents time domain data, and matrix 930 represents frequency domain data.

JPEG lossy compression algorithms operate in three successive stages, DCT transformation, coefficient quantization, and lossless compression. DCT is a class of mathematical operations that include the Fast Fourier Transform (FFT). The basic operation performed by FFT is to transform a signal from one type of representation to another. DCT is used for compression and IDCT is used for decompression. During compression, DCT transforms a set of points from the spatial domain into a representation in the frequency domain. During decompression, an IDCT function converts the spectral representation of the signal back to a spatial one. The formula for the DCT and IDCT is shown in table 1 and table 2, respectively.

TABLE 1

$$DCT(i, j) = \frac{1}{\sqrt{2N}} C(i)C(j) \sum_{x=0}^{N-1} \sum_{y=0}^{N-1} pixel(x, y) COS\left[\frac{(2x+1)i\pi}{2N}\right] COS\left[\frac{(2y+1)j\pi}{2N}\right]$$

$$C(x) = \frac{1}{\sqrt{2}} \text{ if } x \text{ is } 0, \text{ else } 1 \text{ if } x > 0$$

TABLE 2

$$Pixel(x, y) = \frac{1}{\sqrt{2N}} \sum_{i=0}^{N-1} \sum_{j=0}^{N-1} C(i)C(j)DCT(i, j) COS\left[\frac{(2x+1)i\pi}{2N}\right] COS\left[\frac{(2y+1)j\pi}{2N}\right]$$

$$C(x) = \frac{1}{\sqrt{2}} \text{ if } x \text{ is } 0, \text{ else } 1 \text{ if } x > 0$$

One embodiment of the DCT algorithm is performed on an N×N square matrix of pixel values, and it yields an N×N square matrix of frequency coefficients. DCT performs a matrix multiplication of the input pixel data matrix by the transposed cosine transform matrix and stores the result in a temporary N by N matrix. The temporary matrix is multiplied by the cosine transform matrix, and the result is stored in the output matrix.

The DCT computation complexity is simplified by factoring out the transformation matrix into butterfly and shuffle matrices. The butterfly and shuffle matrices can be computed with fast integer addition, the resulting zeroes in the original matrix being trivial to compute. In most of the fast DCT algorithms, optimization usually focuses on reducing the number of DCT arithmetic operations, especially the number of multiplications.

IDCT essentially uses the reverse of the operations performed in the DCT. In one embodiment, the DCT values in the N by N matrix are multiplied by the cosine transform matrix. The result of this transformation is stored in a temporary N by N matrix. This matrix is then multiplied by the transposed cosine transform matrix. The result of this multiplication is stored in the output block of pixels.

Figure 2:
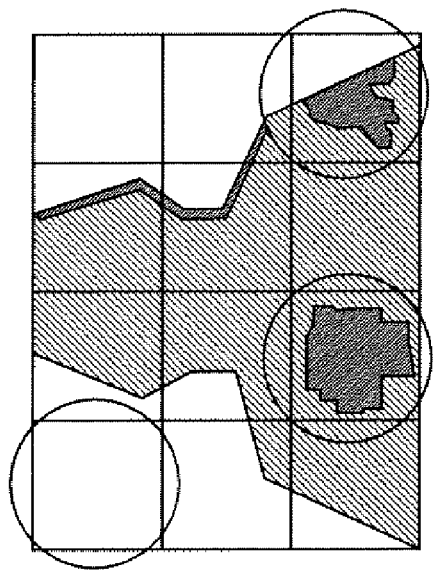
FIG. 2 depicts a bounding box and macroblocks of an arbitrary shaped video object in another embodiment of the present invention.

The MPEG-4 video coding standard supports arbitrary-shape video objects in addition to the conventional frame-based functionalities in MPEG-1 and MPEG-2. Thus, in MPEG-4, the video input is no longer considered as a rectangular region. One of the building blocks for MPEG-4 video coding standard version 2 is the shape-adaptive-DCT (SA-DCT) for arbitrary shape objects. In an MPEG-4 image, there are contour macroblocks which contain the shape edge of an object, as shown in FIG. 2. Instead of performing an 8×8 DCT after filling the non-object pixels, the new standard adaptively performs N-point DCT based on the shape. For contour macroblocks, only object pixels are transformed into DCT domain. The procedure of transforming only object pixels into DCT domain is called shape-adaptive DCT. In one embodiment, this invention optimizes SA-DCT and SA-IDCT for MPEG-4 object based coding scheme using platform-dependent knowledge. Compared to 8×8-DCT, SA-DCT provides a significantly better rate-distortion trade-off, especially at high bit rates.

Standard 8×8 DCT is applied to 8×8 blocks with 64 opaque pixels. In 8×8 blocks that straddle the boundaries of a VOP, standard DCT is replaced by shape adaptive DCT (SA DCT). These boundary blocks are arbitrary shape with at least one transparent pixel in which the number of opaque pels is less than 64.

Similar to standard DCT, forward and inverse SA DCT convert pixel(x,y) to DCT(i,j) and vice versa. SA DCT also keeps all conditions on the internal precision of floating point arithmetic as well as the rounding to integers and the dynamic ranges of pixel(x,y) and DCT(i,j) stated in 8×8 DCT. In contrast to standard 8×8 DCT, the internal processing of SA DCT is controlled by shape parameters, which are derived from the decoded VOP shape. The opaque pixels within the boundary blocks are only transformed and coded. As a consequence, SA DCT does not require the padding technique, if shape coding is lossless, and the number of achieved SA DCT coefficients is identical to the number of opaque pixels in the given boundary block.

Figure 3A:
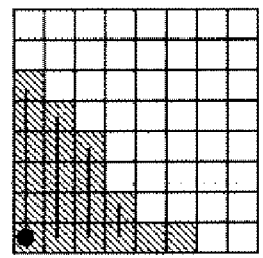

FIGS. 3a–3e depict the SA-DCT baseline algorithm for coding an arbitrarily shaped image segment contained within an 8×8-block. The SA-DCT algorithm is based on predefined orthonormal sets of DCT basis functions. The forward 2D SA-DCT first applies 1D DCT transformation to columns, and then to rows. The inverse 2D SA-DCT applies the 1D IDCT transform first to rows, then to columns. FIG. 3a depicts an image block segmented into two regions, foreground as shown in gray and background as shown lighter. To perform the vertical transform of the foreground, the length (vector size N, 0<N<9) of each column j (0<j<9) of the foreground segment is calculated. As depicted in FIG. 3b, the columns are shifted and aligned to the upper border of the 8×8 reference block.

While dependent on the vector size N of each particular segment column, a 1D n-point DCT, a transform kernel containing a set of N basis vectors DCT-n, is selected for each particular column and applied to the first N column pixels. For example, as depicted in FIG. 3b, the right most column is transformed using 3-point DCT. As depicted in FIG. 3d, before the horizontal DCT transformation, the rows are shifted to the left border of the 8×8 reference block. FIG. 3e depicts the final location of the resulting DCT coefficients within an 8×8-image block.

The final number of DCT coefficients is identical to the number of pixels contained in the image segment. Additionally, the coefficients are located in comparable positions as in a standard 8×8 block. The DC coefficient is located in the upper left border of the reference block and is dependent on the actual shape of the segment. The remaining coefficients are concentrated around the DC coefficient. Since the contour of the segment is transmitted to the receiver prior to transmitting the macroblock information, the decoder performs the shape-adapted inverse DCT as the reserve operation in both horizontal and vertical segment direction on the basis of decoded shape data.

1D N-point DCT is accomplished by the following equation:

TABLE 3

$$y_n = c_n \sum_{k=0}^{N-1} \cos\left(\frac{n(2k+1)}{2N}\pi\right) x_k$$

$$\text{where } c_0 = \frac{1}{\sqrt{N}} \text{ and } c_n = \sqrt{\frac{2}{N}} \text{ for } n = 1, \ldots, N-1$$

The computation of the 2-point DCT can be simplified as follows:

TABLE 4

$$\begin{bmatrix} y_0 \\ y_1 \end{bmatrix} = \begin{bmatrix} \frac{1}{\sqrt{2}} & \frac{1}{\sqrt{2}} \\ \cos\left(\frac{\pi}{4}\right) & \cos\left(\frac{3\pi}{4}\right) \end{bmatrix} \begin{bmatrix} x_0 \\ x_1 \end{bmatrix} =$$

$$\begin{bmatrix} \frac{1}{\sqrt{2}} & \frac{1}{\sqrt{2}} \\ \frac{1}{\sqrt{2}} & -\frac{1}{\sqrt{2}} \end{bmatrix} \begin{bmatrix} x_0 \\ x_1 \end{bmatrix} = \frac{1}{\sqrt{2}} \begin{bmatrix} 1 & 1 \\ 1 & -1 \end{bmatrix} \begin{bmatrix} x_0 \\ x_1 \end{bmatrix}$$

In conventional algorithmic optimization, the number of additions and multiplications is minimized. Thus,

TABLE 5

$$\begin{cases} z_0 = x_0 + x_1 \\ z_1 = x_0 - x_1 \end{cases}$$

$$\begin{cases} y_0 = \frac{1}{\sqrt{2}} z_0 \\ y_1 = \frac{1}{\sqrt{2}} z_1 \end{cases}$$

In this way, only two additions and two multiplications are performed, instead of two additions and four multiplications. The following C code for this algorithm is currently used.

```
void fsadct2_float (float in[2], float out[2])
{
static float f0=0.707107;
out[0]=(in[0]+in[1])* f0;
out[1]=(in[0]-in[1])* f0;
}
```

In one embodiment of the invention, using MMX™ and Streaming SIMD Extensions, two additions and four multiplications can be performed quickly with only one PMADDWD instruction for the 2-point DCT as follows:

```
void fsadct2_mmx (short in[2], short out[2])
{
    static __int64 xstatic1 = 0xA57E5A825A825A82;  // -f0 f0 f0 f0
    static __int64 rounding = 0x0000400000004000;
    __asm {
        mov eax, in
        mov ecx, out
        movd mm0, [eax]    // mm0 = xx, xx i1, i0,
        pshufw mm1, mm0, 01000100b   // mm1 = i1, i0, i1, i0,
        pmaddwd mm1, xstatic1   // mm1 = i0*f0 -i1*f0, i0*f0 + i1*f0
        paddd mm1, rounding     // do proper rounding
        psrad mm1, 15
        packssdw mm1, mm7       // mm1 = x, x, o1, o0,
        movd [ecx], mm1
    }
}
```

The computational complexity of the 3-point DCT can be simplified as follows:

TABLE 6

$$\begin{bmatrix} y_0 \\ y_1 \\ y_2 \end{bmatrix} = \begin{bmatrix} \frac{1}{\sqrt{3}} & \frac{1}{\sqrt{3}} & \frac{1}{\sqrt{3}} \\ \sqrt{\frac{2}{3}}\cos\left(\frac{\pi}{6}\right) & \sqrt{\frac{2}{3}}\cos\left(\frac{3\pi}{6}\right) & \sqrt{\frac{2}{3}}\cos\left(\frac{5\pi}{6}\right) \\ \sqrt{\frac{2}{3}}\cos\left(\frac{2\pi}{6}\right) & \sqrt{\frac{2}{3}}\cos\left(\frac{6\pi}{6}\right) & \sqrt{\frac{2}{3}}\cos\left(\frac{10\pi}{6}\right) \end{bmatrix} \begin{bmatrix} x_0 \\ x_1 \\ x_2 \end{bmatrix} =$$

$$\sqrt{\frac{2}{3}} \begin{bmatrix} \frac{1}{\sqrt{2}} & \frac{1}{\sqrt{2}} & \frac{1}{\sqrt{2}} \\ \cos\left(\frac{\pi}{6}\right) & 0 & -\cos\left(\frac{\pi}{6}\right) \\ \cos\left(\frac{\pi}{3}\right) & -1 & -\cos\left(\frac{\pi}{3}\right) \end{bmatrix} \begin{bmatrix} x_0 \\ x_1 \\ x_2 \end{bmatrix} =$$

$$\sqrt{\frac{2}{3}} \begin{bmatrix} \frac{1}{\sqrt{2}} & \frac{1}{\sqrt{2}} & 0 \\ 0 & 0 & \cos\left(\frac{\pi}{6}\right) \\ 0 & -1 & \cos\left(\frac{\pi}{3}\right) \end{bmatrix} \begin{bmatrix} 1 & 0 & 1 \\ 0 & 1 & 0 \\ 1 & 0 & -1 \end{bmatrix} \begin{bmatrix} x_0 \\ x_1 \\ x_2 \end{bmatrix}$$

In one embodiment of the invention the following is the MMX™ code implementation of the 3 point DCT algorithm:

```
void fsadct3_mmx (short in [3], short out [3])
{
    static __int64 xconst1 = 0x0000000049E749E7;  // f0 f0 0 1
    static __int64 xconst2 = 0x5A82A57E977D3441;  // f1 -f1 -f3 f2
    static __int64 rounding = 0x0000400000004000;
    __asm {
        mov eax, in
        movd mm0, [eax]    // 0 0 i1 i0
        movd mm5, [eax+2]  // 0 0 i2 i1
        movq mm7, rounding
        pshufw mm4, mm0, 00111100b   // i0 0 0 i0
        pshufw mm3, mm5, 11010001b   // 0 i2 i1 i2
        paddsw mm4, mm3    // i0 i2 i1 i0+i2
        movq mm1, mm4
```

-continued

```
        pmaddwd mm4, xconst1    // 0 (i0+i1+i2 * f0) << 15
                                // o0 << 15
        pmaddwd mm1, xconst2    // (i0-i2)*f1 << 15 i0+i2*f2 -
i1*f3
                                // o1 << 15    o2 << 15
        paddd mm1, mm7          // do proper rounding
        paddd mm4, mm7          // do proper rounding
        psrad mm1, 15           // o0
        psrad mm4, 15           // o1 o2
        packssdw mm1, mm7       // xx o1 o2
        mov eax, out
        pshufw mm2, mm1, 11110001b  // xx o2 o1
        packssdw mm4, mm7       // x x x o0
        movd [eax], mm4  // save o0
        movd [eax+2], mm2       // save o1, o2
    }
}
```

The 4-point DCT can be computed as shown in Table 7. Multiplication operations can be paired (or grouped) within the matrix.

TABLE 7

$$\begin{bmatrix} y_0 \\ y_1 \\ y_2 \\ y_3 \end{bmatrix} = \begin{bmatrix} \frac{1}{\sqrt{4}} & \frac{1}{\sqrt{4}} & \frac{1}{\sqrt{4}} & \frac{1}{\sqrt{4}} \\ \sqrt{\frac{2}{4}}\cos(\frac{\pi}{8}) & \sqrt{\frac{2}{4}}\cos(\frac{3\pi}{8}) & \sqrt{\frac{2}{4}}\cos(\frac{5\pi}{8}) & \sqrt{\frac{2}{4}}\cos(\frac{7\pi}{8}) \\ \sqrt{\frac{2}{4}}\cos(\frac{2\pi}{8}) & \sqrt{\frac{2}{4}}\cos(\frac{6\pi}{8}) & \sqrt{\frac{2}{4}}\cos(\frac{10\pi}{8}) & \sqrt{\frac{2}{4}}\cos(\frac{14\pi}{8}) \\ \sqrt{\frac{2}{4}}\cos(\frac{3\pi}{8}) & \sqrt{\frac{2}{4}}\cos(\frac{9\pi}{8}) & \sqrt{\frac{2}{4}}\cos(\frac{15\pi}{8}) & \sqrt{\frac{2}{4}}\cos(\frac{21\pi}{8}) \end{bmatrix} \begin{bmatrix} x_0 \\ x_1 \\ x_2 \\ x_3 \end{bmatrix}$$

The above 4-point DCT can be further written as:

TABLE 8

$$\begin{bmatrix} y_0 \\ y_1 \\ y_2 \\ y_3 \end{bmatrix} = \sqrt{\frac{1}{2}} \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} \frac{1}{\sqrt{2}}\begin{bmatrix}1 & 1 \\ 1 & -1\end{bmatrix} & 0 \\ 0 & \begin{matrix}\cos(\frac{3\pi}{8}) & \cos(\frac{\pi}{8}) \\ -\cos(\frac{\pi}{8}) & \cos(\frac{3\pi}{8})\end{matrix} \end{bmatrix}$$

$$\begin{bmatrix} 1 & 0 & 0 & 1 \\ 0 & 1 & 1 & 0 \\ 0 & 1 & -1 & 0 \\ 1 & 0 & 0 & -1 \end{bmatrix} \begin{bmatrix} x_0 \\ x_1 \\ x_2 \\ x_3 \end{bmatrix}$$

Even if the upper left cosine block in the original matrix is further factored, leaving two multiplication operations, two PMADDWD operations would still be needed, plus a substantial amount of additional instructions to shuffle and add the results. Many existing algorithms do not reduce the clock cycle count of the implementation in MMX™ although they minimize the number of addition and multiplication operations. To reduce processor time by having operations done with minimal SIMD operations (e.g., PMADDWD), the above 4-point DCT can be further written as:

TABLE 9

$$\begin{bmatrix} y_0 \\ y_1 \\ y_2 \\ y_3 \end{bmatrix} = \sqrt{\frac{1}{2}} \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} \frac{1}{\sqrt{2}} & \frac{1}{\sqrt{2}} & 0 & 0 \\ \frac{1}{\sqrt{2}} & -\frac{1}{\sqrt{2}} & 0 & 0 \\ 0 & 0 & \cos(\frac{3\pi}{8}) & \cos(\frac{\pi}{8}) \\ 0 & 0 & -\cos(\frac{\pi}{8}) & \cos(\frac{3\pi}{8}) \end{bmatrix}$$

$$\begin{bmatrix} 1 & 0 & 0 & 1 \\ 0 & 1 & 1 & 0 \\ 0 & 1 & -1 & 0 \\ 1 & 0 & 0 & -1 \end{bmatrix} \begin{bmatrix} x_0 \\ x_1 \\ x_2 \\ x_3 \end{bmatrix}$$

In one embodiment of the invention, the following is the MMX™ implementation of the 4 point DCT algorithm:

```
void fsadct4_mmx (short in[4], short out[4])
{
    static __int64 xstatic1 = 0x4000C00040004000;  // f0 -f0 f0 f0
    static __int64 xstatic2 = 0xDD5D539F22A3539F;  // -f1 f2 f1 f2
    static __int64 rounding = 0x0000400000004000;
    __asm {
        mov eax, in
        mov ecx, out
        movq mm0, [eax]         // i3 i2 i1 i0
        pshufw mm1, mm0, 00011011b  // i0 i1 i2 i3
        movq mm2, mm1
        paddsw mm2, mm0         // b0 b1 b1 b0
        psubsw mm0, mm1         // -b3 -b2 b2 b3
        pmaddwd mm2, xstatic1   // o1 << 15   o0 << 15
        pmaddwd mm0, xstatic2   // o3 << 15   o2 << 15
        paddd mm2, rounding     // do proper rounding
        paddd mm0, rounding     // do proper rounding
        psrad mm2, 15
        psrad mm0, 15
        packssdw mm2, mm0       // o3 o1 o2 o0
        pshufw mm3, mm2, 11011000b  // o3 o2 o1 o0
        movq [ecx], mm3
}
```

The following matrix definitions are presented for illustrative purposes to define, or name, specific matrices in tables 7, 8 and 9. The values within the matrices defined below represent one embodiment of the invention.

$$\begin{bmatrix} \frac{1}{\sqrt{4}} & \frac{1}{\sqrt{4}} & \frac{1}{\sqrt{4}} & \frac{1}{\sqrt{4}} \\ \sqrt{\frac{2}{4}}\cos\left(\frac{\pi}{8}\right) & \sqrt{\frac{2}{4}}\cos\left(\frac{3\pi}{8}\right) & \sqrt{\frac{2}{4}}\cos\left(\frac{5\pi}{8}\right) & \sqrt{\frac{2}{4}}\cos\left(\frac{7\pi}{8}\right) \\ \sqrt{\frac{2}{4}}\cos\left(\frac{2\pi}{8}\right) & \sqrt{\frac{2}{4}}\cos\left(\frac{6\pi}{8}\right) & \sqrt{\frac{2}{4}}\cos\left(\frac{10\pi}{8}\right) & \sqrt{\frac{2}{4}}\cos\left(\frac{14\pi}{8}\right) \\ \sqrt{\frac{2}{4}}\cos\left(\frac{3\pi}{8}\right) & \sqrt{\frac{2}{4}}\cos\left(\frac{9\pi}{8}\right) & \sqrt{\frac{2}{4}}\cos\left(\frac{15\pi}{8}\right) & \sqrt{\frac{2}{4}}\cos\left(\frac{21\pi}{8}\right) \end{bmatrix} =$$

Matrix $[A]$, as shown in Table 7

As shown in Table 8, $$\text{Shuffle Matrix } [S] = \begin{bmatrix} 1 & 0 & 0 & 0 \\ 0 & 0 & 1 & 0 \\ 0 & 1 & 0 & 0 \\ 0 & 0 & 0 & 1 \end{bmatrix}.$$

$$\begin{bmatrix} \frac{1}{\sqrt{2}}\begin{bmatrix} 1 & 1 \\ 1 & -1 \end{bmatrix} & 0 \\ 0 & \begin{matrix} \cos\left(\frac{3\pi}{8}\right) & \cos\left(\frac{\pi}{8}\right) \\ -\cos\left(\frac{\pi}{8}\right) & \cos\left(\frac{3\pi}{8}\right) \end{matrix} \end{bmatrix} = \text{Multiplication Matrix } [M],$$

as shown in Table 8.

As shown in Table 8, $$\text{Butterfly Matrix } [B] = \begin{bmatrix} 1 & 0 & 0 & 1 \\ 0 & 1 & 1 & 0 \\ 0 & 1 & -1 & 0 \\ 1 & 0 & 0 & -1 \end{bmatrix}.$$

Group 1 and Group 2 as shown below are presented for illustrative purposes to define a part of matrix $[M]$ in Table 8. The values below represent one embodiment of the invention. Group 1 and Group 2 are "paired." or "grouped". That is, the multiplication operations within matrix $[M]$ of predetermined values are paired, thereby reducing processor instructions.

$$\text{Group 1} = \begin{matrix} \frac{1}{\sqrt{2}} \\ \frac{1}{\sqrt{2}} \end{matrix}$$

$$\text{Group 2} = \begin{matrix} \frac{1}{\sqrt{2}} \\ -\frac{1}{\sqrt{2}} \end{matrix}$$

The method described above can be provided in applications (e.g., video applications) to potentially increase the performance of the applications by decreasing the time to perform n-point DCT, n-point IDCT, SA-DCT, and SA-IDCT over known techniques. In one embodiment, the MMX™ versions of the n-point DCTs performed from 1.3 to 3.0 times faster than fixed-point versions. In one embodiment in which a complete and optimized implementation of SA-DCT/SA-IDCT on Intel processors is demonstrated, the SA-DCT/SA-IDCT process is increased by 1.1 to 1.5 times.

Also compared in table 10 is the performance of an MMX™ 8×8 DCT/IDCT embodiment.

TABLE 10

|  |  | Time (seconds after 10 million iterations) | | | Increase in speed when using MMX ™ | |
| --- | --- | --- | --- | --- | --- | --- |
|  |  | Floating Point | Integer | MMX ™ | Speed Increase from Floating Point | Speed Increase from Integer |
| DCT | 2 | 1260 | 830 | 600 | 2.10 | 1.38 |
| DCT | 3 | 1100 | 1040 | 770 | 1.42 | 1.35 |
| DCT | 4 | 1430 | 1380 | 710 | 2.01 | 1.94 |
| DCT | 5 | 1810 | 1700 | 1050 | 1.72 | 1.61 |
| DCT | 6 | 2140 | 2030 | 1100 | 1.94 | 1.84 |
| DCT | 7 | 4070 | 3020 | 1200 | 3.39 | 2.51 |
| DCT | 8 | 4400 | 3460 | 1150 | 3.82 | 3.00 |
| IDCT | 2 | 830 | 770 | 600 | 1.38 | 1.28 |
| IDCT | 3 | 1100 | 1040 | 770 | 1.42 | 1.35 |
| IDCT | 4 | 1540 | 1430 | 710 | 2.16 | 2.01 |
| IDCT | 5 | 1920 | 1870 | 880 | 2.18 | 2.12 |
| IDCT | 6 | 2310 | 2140 | 1210 | 1.90 | 1.76 |
| IDCT | 7 | 3680 | 3460 | 1150 | 3.20 | 3.00 |
| IDCT | 8 | 3740 | 2960 | 1260 | 2.96 | 2.34 |

Having disclosed exemplary embodiments, modifications and variations may be made to the disclosed embodiments while remaining within the spirit and scope of the invention as defined by the appended claims.

The following code, shown in the Appendix, represents one embodiment of the invention to implement the 5-point DCT,6-point DCT,7-point DCT, and 8-point DCT and the 2-point IDCT,3-point IDCT,4-point IDCT,5-point IDCT,6-point IDCT,7-point IDCT, and 8-point IDCT algorithms.

Appendix

```
void fsadct5_mmx (short in [5], short out [5])
{
    static __int64 xconst1  = 0x2F954CFEE6FC417E;    // f2 f1 -f4 f3
    static __int64 xconst2  = 0xB3022F95BE821904;    // -f1 f2 -f3 f4
    static __int64 xconst3  = 0x393E393E000050F4;    // f0 f0  0 f5
    static __int64 rounding = 0x0000400000004000;

__asm {
        mov eax, in
        movq mm0, [eax]                   // i3 i2 i1 i0
        pshufw mm1, [eax+2], 01011011b    // i2 i2 i3 i4
        movq mm2, mm0                     // i3 i2 i1 i0
        movq mm6, mm1                     // i2 i2 i3 i4
        paddsw mm0, mm1                   //  x  x b2 b0
        psubsw mm2, mm1                   //  x  x b3 b1
        punpcklwd mm0, mm2                // b3 b2 b1 b0
```

```
    pshufw mm1, mm0, 11011000b    // b3 b1 b2 b0
    movq mm2, mm1 pmaddwd mm1, xconst1    // (b1*f1+b3*f2) << 15 (b0*f3-b2*f4) << 15
                            // o1              o2 + b4
                            // SAVE
    movq mm5, rounding
    pmaddwd mm2, xconst2    // (b1*f2-b3*f1) << 15 (b0*f4-b2*f3) << 15
                            // o3              o4 - b4
                            // SAVE pshufw mm4, mm0, 00001000b  // 0 0 b2 b0
    psllq mm4, 32           // b2 b0 0 0
    psrlq mm6, 48           // 0 0 0 i2
    pshufw mm3, mm6, 11001100b  // 0 i2 0 i2
    paddsw mm4, mm3         // b2 b0+i2 0 i2
    pmaddwd mm4, xconst3    // (b2+b0+i2)*f0   i2*f5
                            // (o0) << 15     (b4) << 15
    movq mm7, mm4
    paddd mm7, mm5          // do proper rounding
    psrad mm7, 15           // o0 x
    packssdw mm7, mm0       // x x o0 x
    psrlq mm7, 16
    mov eax, out
    movd [eax], mm7         // store o0 psllq mm4, 32
    psrlq mm4, 32           // 0 (b4 << 15)
    psubd mm1, mm4          // (o1 << 15) (o2 << 15)
    paddd mm2, mm4          // (o3 << 15) (o4 << 15)
    paddd mm1, mm5          // do proper rounding
    paddd mm2, mm5          // do proper rounding
    psrad mm1, 15           // x o1 x o2
    psrad mm2, 15           // x o3 x o4
    packssdw mm1, mm2       // o3 o4 o1 o2
    pshufw mm0, mm1, 177    // o4 o3 o2 o1
    movq [eax+2], mm0
    }
} void fsadct6_mmx (short in[6], short out[6])
{
    static __int64 xconst1  = 0xCBBF344134413441;  // -f0 f0 f0 f0
    static __int64 xconst2  = 0xB61924F34000C000;  // -f3 f2 f1 -f1
    static __int64 xconst3  = 0x0000132034414762;  // 0 f4 f0 f5
    static __int64 xconst4  = 0x00004762CBBF1320;  // 0 f5 -f0 f4
    static __int64 rounding = 0x0000400000004000;

__asm {
        mov eax, in
        movq mm0, [eax]         // i3 i2 i1 i0
        movq mm1, [eax+4]       // i5 i4 i3 i2
        xor eax, eax
        movq mm7, rounding
        pshufw mm2, mm1, 01011011b   // i3 i3 i4 i5
        movq mm1, mm0
        paddsw mm0, mm2
        pinsrw mm0, eax, 3      // mm0 = 0 b2 b1 b0
        psubsw mm1, mm2         // mm1 = 0 b5 b4 b3 pshufw mm6, mm0, 11111110b   // 0 0 0 b2
        paddsw mm6, mm0         // 0 x b1 b0+b2
```

```
    pshufw mm3, mm1, 11111011b   // 0 0 b5 0
    paddsw mm3, mm1              // 0 x b4+b5 b3
    psllq mm3, 32
    pshufw mm2, mm6, 11110100b
    paddsw mm2, mm3              // b4+b5 b3 b1 b0+b2
    pmaddwd mm2, xconst1         // mm2 = o3 << 15  o0 << 15 pshufw mm3, mm0, 01100010b   // b1 b2 b0 b2
    pshufw mm4, mm0, 11001111b   // 0 b0 0 0
    paddsw mm3, mm4              // b1 b0+b2 b0 b2
    pmaddwd mm3, xconst2         // mm3 = o4 << 15  o2 << 15 movq mm4, mm1
    pmaddwd mm1, xconst3         // b5 * f4 << 15  (b4 * f0 + b5 * f4) << 15
    pmaddwd mm4, xconst4         // b5 * f5 << 15  (-b4 * f0 + b3 * f4) << 15
    pshufw mm5, mm1, 00001110b   // x x b5 * f4 << 15
    pshufw mm6, mm4, 00001110b   // x x b5 * f5 << 15
    paddd mm5, mm1               // mm5 = x o1 << 15
    paddd mm6, mm4               // mm6 = x o5 << 15 paddd mm2, mm7               // do proper rounding
    paddd mm3, mm7
    paddd mm5, mm7
    paddd mm6, mm7
    psrad mm2, 15                // x o3 x o0
    psrad mm3, 15                // x o4 x o2
    psrad mm5, 15
    psrad mm6, 15 mov eax, out
    packssdw mm3, mm2            // o3 o0 o4 o2
    pshufw mm2, mm3, 01110010b   // o4 o3 o2 o0
    movq mm1, mm2
    punpcklwd mm1, mm5           // x x o1 o0
    movd [eax], mm1              // store o0, o1
    psrlq mm2, 16                // 0 o4 o3 o2
    psllq mm6, 48                // o5 0 0 0
    paddsw mm2, mm6              // o5 o4 o3 o2
    movq [eax+4], mm2            // store o2, o3, o4, o5
    }
} void fsadct7_mmx (short in[7], short out[7])
{
    static int f0_7 = 0x3061;
    static int f1_7 = 0x42B4;
    static int f2_7 = 0x3DA5;
    static int f3_7 = 0x357E;
    static int f4_7 = 0x2AA9;
    static int f5_7 = 0x1DB0;
    static int f6_7 = 0x0F39;
    static int f7_7 = 0x446B;
    static int b[7];

static __int64 xconst1 = 0x357E42B40F393DA5;  // f3 f1 f6 f2
    static __int64 xconst2 = 0xE250357EC25B2AA9;  // -f5 f3 -f2 f4
    static __int64 xconst3 = 0xBD4C1DB0D5570F39;  // -f1 f5 -f4 f6
    static __int64 xconst4 = 0x0000446B30613061;  // 0 f7 f0 f0
    static __int64 xconst5 = 0x00001DB00000D557;  // 0 f5 0 -f4
    static __int64 xconst6 = 0x0000BD4C0000F0C7;  // 0 -f1 0 -f6
    static __int64 xconst7 = 0x0000357E00003DA5;  // 0 f3 0 f2
    static __int64 rounding = 0x0000400000004000;
```

```
__asm {
    mov eax, in
    movq mm0, [eax]              // i3 i2 i1 i0
    movq mm2, [eax+6]            // i6 i5 i4 i3
    pextrw ecx, mm0, 3           // i3
    pshufw mm1, mm2, 00011011b   // i3 i4 i5 i6
    movq mm2, mm0
    paddsw mm0, mm1              // x b4 b2 b0
    psubsw mm2, mm1              // 0 b5 b3 b1
    movq mm1, mm0
    punpcklwd mm0, mm2           // b3 b2 b1 b0
    punpckhwd mm1, mm2           // 0 x b5 b4
    pshufw mm5, mm1, 11011100b   // 0 b5 0 b4
    pshufw mm4, mm0, 11011000b   // b3 b1 b2 b0 movq mm1, mm4                // b3 b1 b2 b0
    movq mm2, mm4                // b3 b1 b2 b0
    movq mm3, mm4                // b3 b1 b2 b0 pmaddwd mm1, xconst1         // (b1*f1+b3*f3) << 15  (b0*f2+b2*f6) << 15
    pmaddwd mm2, xconst2         // (b1*f3-b3*f5) << 15  (b0*f4-b2*f2) << 15
    pmaddwd mm3, xconst3         // (b1*f5-b3*f1) << 15  (b0*f6-b2*f4) << 15 movq mm6, mm5
    pinsrw mm6, ecx, 2           // 0 i3 0 b4
    paddsw mm0, mm6              // x b2+i3 x b4+b0
    pshufw mm6, mm0, 00001000b   // x x b2+i3 b4+b0
    movq mm0, rounding
    pinsrw mm6, ecx, 2           // x i3 b0+b2 b4+i3
    pmaddwd mm6, xconst4         // b6 << 15  o0 << 15
    movq mm4, mm6 mov ecx, out
    paddd mm6, mm0               // do proper rounding
    psrad mm6, 15
    packssdw mm6, mm1            // x x x o0
    movd dword ptr [ecx], mm6    // save o0 movq mm6, mm5                // x b5 x b4
    movq mm7, mm5                // x b5 x b4
    pmaddwd mm5, xconst5         // (+b5*f5) << 15  (-b4*f4) << 15
    pmaddwd mm6, xconst6         // (-b5*f1) << 15  (-b4*f6) << 15
    pmaddwd mm7, xconst7         // (+b5*f3) << 15  (+b4*f2) << 15 paddd mm1, mm5               // o1 << 15  o2 << 15 + b6
    paddd mm2, mm6               // o3 << 15  o4 << 15 - b6
    paddd mm3, mm7               // o5 << 15  o6 << 15 + b6
    psrlq mm4, 32 psubd mm1, mm4               // o1 << 15  o2 << 15
    paddd mm2, mm4               // o3 << 15  o4 << 15
    psubd mm3, mm4               // o5 << 15  o6 << 15
    paddd mm1, mm0               // do proper rounding
    paddd mm2, mm0               // do proper rounding
    paddd mm3, mm0               // do proper rounding psrad mm1, 15                // o1 o2
    psrad mm2, 15                // o3 o4
    psrad mm3, 15                // o5 o6 packssdw mm2, mm1            // o1 o2 o3 o4
```

```
        pshufw mm1, mm2, 27        // o4 o3 o2 o1
        movq [ecx+2], mm1          // save o1, o2, o3, o4 packssdw mm3, mm7          // x x o5 o6
        pshufw mm1, mm3, 00000001b
        movd dword ptr [ecx+10], mm1  // save o5, o6
    }
} void fsadct8_mmx (short in[8], short out[8])
{
    static __int64 xconst1 = 0xA57E5A825A825A82;// -f0 f0 f0 f0
    static __int64 xconst2 = 0xD2BF2D412D412D41;// -f4 f4 f4 f4
    static __int64 xconst3 = 0xC4E0187D187D3B20; // -f2 f6 f6 f2
    static __int64 xconst4 = 0x3536238E0C7C3EC5; // f3 f5 f7 f1
    static __int64 xconst5 = 0xDC723536C13B0C7C ;//-f5 f3 -f1 f7
    static __int64 rounding = 0x0000400000004000;

__asm {
        mov eax, in
        movq mm0, [eax]            // i3 i2 i1 i0
        movq mm1, [eax+8]          // i7 i6 i5 i4
        pshufw mm2, mm1, 00011011b // i4 i5 i6 i7
        movq mm7, rounding
        movq mm1, mm0
        paddsw mm0, mm2            // mm0 = b[3] b[2] b[1] b[0] (A*)
        psubsw mm1, mm2            // mm1 = b[4] b[5] b[6] b[7] (A*)

pshufw mm2, mm0, 00001011b // x x b[2] b[3]
        movq mm3, mm0
        psubsw mm3, mm2            // mm3 = x x b2[2] b2[3] (B*)
        paddsw mm2, mm0            // mm2 = x x b2[1] b2[0] (B*)
        pshufw mm4, mm1, 00001100b // mm4 = x x b2[4] b2[7] (B*)
        pshufw mm0, mm1, 10011001b // b[5] b[6] b[5] b[6]
        pmaddwd mm0, xconst1       // b2[5] << 15  b2[6] << 15
        paddd mm0, mm7             // do proper rounding
        psrad mm0, 15              // b2[5] b2[6]
        packssdw mm0, mm1          // mm0 = x x b2[5] b2[6] (B*)

pshufw mm5, mm2, 01000100b // b2[1] b2[0] b2[1] b2[0]
        pmaddwd mm5, xconst2       // o4 << 15  o0 << 15
        pshufw mm2, mm3, 01000100b // b2[2] b2[3] b2[2] b2[3]
        pmaddwd mm2, xconst3       // o6 << 15  o2 << 15
        paddd mm5, mm7             // do proper rounding
        paddd mm2, mm7             // do proper rounding
        psrad mm5, 15
        psrad mm2, 15
        packssdw mm5, mm2          // mm5 = o6 o2 o4 o0 (Y*)
        movq mm1, mm4
        paddsw mm4, mm0            // x x b3[4] b3[7]
        psubsw mm1, mm0            // x x b3[5] b3[6]
        punpcklwd mm4, mm1         // b3[5] b3[4] b3[6] b3[7]
        pshufw mm3, mm4, 11011000b // mm4 = b3[5] b3[6] b3[4] b3[7] (C*)

movq mm4, mm3
        pmaddwd mm3, xconst4       // o5 << 15  o1 << 15
        pmaddwd mm4, xconst5       // o3 << 15  o7 << 15
        paddd mm3, mm7             // do proper rounding
        paddd mm4, mm7             // do proper rounding
        psrad mm3, 15
        psrad mm4, 15
        packssdw mm3, mm4          // mm3 = o3 o7 o5 o1 (Y*)
```

```
        pshufw mm0, mm5, 11011000b    // mm0 = o6 o4 o2 o0
        pshufw mm1, mm3, 10011100b    // mm3 = o7 o5 o3 o1
        movq mm2, mm0
        punpcklwd mm2, mm1            // o3 o2 o1 o0
        punpckhwd mm0, mm1            // o7 o6 o5 o4
        mov eax, out
        movq [eax], mm2
        movq [eax+8], mm0
    }
}

///////////////////////////////////////////////// void fsaidct2_mmx (short in[2], short out[2])
{
    static __int64 xconst1 = 0xA57E5A825A825A82;    // -f0 f0 f0 f0
    static __int64 rounding = 0x0000400000004000;

__asm {
        mov eax, in
        mov ecx, out
        movd mm0, [eax]
        pshufw mm1, mm0, 01000100b    // i1 i0 i1 i0
        pmaddwd mm1, xconst1          // o1 << 15  o0 << 15
        paddd mm1, rounding           // do proper rounding
        psrad mm1, 15
        packssdw mm1, mm7             // x x o1 o0
        movd [ecx], mm1
    }
} void fsaidct3_mmx (short in[3], short out[3])
{
    static __int64 xconst1 = 0x49E7977D49E73441;    // f0 -f3 f0 f2
    static __int64 xconst2 = 0x0000A57E00005A82;    // 0 -f1 0 f1
    static __int64 rounding = 0x0000400000004000;

__asm {
        mov eax, in
        movd mm0, [eax]               // 0 0 i1 i0
        movd mm1, [eax+2]             // 0 0 i2 i1
        mov eax, out
        movq mm7, rounding
        psllq mm0, 32
        paddd mm0, mm1                // i1 i0 i2 i1
        pshufw mm1, mm0, 10011001b    // i0 i2 i0 i2
        pmaddwd mm1, xconst1          // o1 << 15  b2 << 15
        pshufw mm2, mm0, 11111111b    // i1 i1 i1 i1
        pmaddwd mm2, xconst2          // -b1 << 15  b1 << 15
        pshufw mm3, mm1, 01000100b    // b2 << 15  b2 << 15
        paddd mm2, mm3                // o2 << 15  o0 << 15
        paddd mm1, mm7                // do proper rounding
        paddd mm2, mm7
        psrad mm1, 15                 // x o1 x x
        psrad mm2, 15                 // x o2 x o0
        movd [eax], mm2               // store o0
        packssdw mm1, mm2             // o2 x o1 x
        pshufw mm2, mm1, 11111101b    // x x o2 o1
        movd [eax+2], mm2             // store o1, o2
    }
}
```

```
void fsaidct4_mmx (short in[4], short out[4])
{
    static __int64 xconst1 = 0xC000400040004000;  // -f0 f0 f0 f0
    static __int64 xconst2 = 0xAC6122A322A3539F;  // -f2 f1 f1 f2
    static __int64 rounding = 0x0000400000004000;

__asm {
        mov eax, in
        movq mm7, rounding
        movq mm0, [eax]              // i3 i2 i1 i0
        mov eax, out
        pshufw mm1, mm0, 10001000b   // i2 i0 i2 i0
        pmaddwd mm1, xconst1         // mm1 = b[1] << 15  b[0] << 15
        pshufw mm2, mm0, 11011101b   // i3 i1 i3 i1
        pmaddwd mm2, xconst2         // mm2 = b[2] << 15  b[3] << 15
        movq mm3, mm1
        paddd mm1, mm2               // o1 << 15   o0 << 15
        psubd mm3, mm2               // o2 << 15   o3 << 15
        paddd mm1, mm7               // do proper rounding
        paddd mm3, mm7
        psrad mm1, 15
        psrad mm3, 15
        packssdw mm1, mm3            // o2 o3 o1 o0
        pshufw mm2, mm1, 10110100b   // o3 o2 o1 o0
        movq [eax], mm2
    }
} void fsaidct5_mmx (short in[5], short out[5])
{
    static __int64 xconst1 = 0xB3022F952F954CFE;  // -f1 f2 f2 f1
    static __int64 xconst2 = 0xBE82E6FC1904417E;  // -f3 -f4 f4 f3
    static __int64 xconst3 = 0x0000393E0000393E;  // 0 f0 0 f0
    static __int64 xconst4 = 0x0000000050F4AF0C;  // 0 0 f5 -f5
    static __int64 rounding = 0x0000400000004000;

__asm {
        mov eax, in
        movq mm0, [eax+2]            // mm0 = i4 i3 i2 i1
        movd mm6, [eax]              // x x i1 i0
        movq mm7, rounding
        pshufw mm1, mm0, 10001000b   // i3 i1 i3 i1
        pmaddwd mm1, xconst1         // mm1 = b2 << 15  b1 << 15
        pshufw mm2, mm0, 11011101b   // i4 i2 i4 i2
        movq mm5, mm2
        pmaddwd mm2, xconst2         // b4 << 15    b3 << 15
        pshufw mm3, mm6, 00000000b   // i0 i0 i0 i0
        pmaddwd mm3, xconst3         // mm3 = b0 << 15   b0 << 15
        paddd mm2, mm3               // mm2 = b4 << 15   b3 << 15
        movq mm4, mm2
        paddd mm4, mm1               // o1 << 15     o0 << 15
        psubd mm2, mm1               // o3 << 15     o4 << 15
        pmaddwd mm5, xconst4         // x (i4 - i2) * f5
        paddd mm5, mm3               // x o2 << 15 mov eax, out
        paddd mm4, mm7               // do proper rounding
        paddd mm2, mm7
        paddd mm5, mm7
        psrad mm4, 15
        psrad mm2, 15
```

```
            psrad mm5, 15
            packssdw mm4, mm2              // o3 o4 o1 o0
            packssdw mm5, mm7              // x x x o2
            movd [eax], mm4                // store o0, o1
            pshufw mm3, mm4, 00001011b     // x x o4 o3
            movd [eax+4], mm5              // store o2
            movd [eax+6], mm3              // store o3, o4
        }
    } void fsaidct6_mmx (short in[6], short out[6])
    {
        static __int64 xconst1 = 0xC000344140003441;  // -f1 f0 f1 f0
        static __int64 xconst2 = 0x000024F33441B619;  // 0 f2 f0 -f3
        static __int64 xconst3 = 0x4762132013204762;  // f5 f4 f4 f5
        static __int64 xconst4 = 0x344100003441CBBF;  // f0 0 f0 -f0
        static __int64 rounding = 0x0000400000004000;

__asm {
            mov eax, in
            movq mm0, [eax]                // i3 i2 i1 i0
            movd mm1, [eax+8]              // 0 0 i5 i4
            punpcklwd mm1, mm0             // i1 i5 i0 i4
            pshufw mm2, mm0, 10001000b     // i2 i0 i2 i0
            pmaddwd mm2, xconst1           // b0-b1 << 15   b0+b1 << 15 pshufw mm3, mm1, 00000100b     // i4 i4 i0 i4
            pmaddwd mm3, xconst2           // mm3 = (b2) << 15    b4 << 15 pshufw mm4, mm3, 11101110b     // b2 << 15      b2 << 15
            paddd mm2, mm4                 // mm2 = b5 << 15      b3 << 15 pshufw mm4, mm1, 11101110b     // i1 i5 i1 i5
            mov eax, out
            pmaddwd mm4, xconst3           // i1*f5+i5*f4 << 15  i1*f4+i5*f5 << 15
            pextrw ecx, mm1, 2
            movq mm7, rounding
            pinsrw mm0, ecx, 0             // i3 i2 i1 i5
            pmaddwd mm0, xconst4           // b2 << 15   (i1-i5)*f0 << 15
            pshufw mm1, mm0, 11101110b     // b2 << 15      b2 << 15
            movq mm6, mm1
            paddd mm1, mm4                 // b0 << 15   x
            psubd mm4, mm6                 // x   b2 << 15
            psubd mm0, mm6                 // mm0 = x   b1 << 15
            psrlq mm1, 32
            psllq mm4, 32
            paddd mm1, mm4                 // mm1 = b2 << 15    b0 << 15
            movq mm5, mm1
            movq mm6, mm0
            paddd mm1, mm2                 // o2 << 15      o0 << 15
            psubd mm2, mm5                 // o3 << 15      o5 << 15
            paddd mm0, mm3                 //    x      o1 << 15
            psubd mm3, mm6                 //    x      o4 << 15
            paddd mm0, mm7                 // do proper rounding
            paddd mm1, mm7
            paddd mm2, mm7
            paddd mm3, mm7
            psrad mm0, 15
            psrad mm1, 15
            psrad mm2, 15
            psrad mm3, 15
            packssdw mm1, mm0              // x o1 o2 o0
```

```
        packssdw mm2, mm3          // x o4 o3 o5
        psllq mm1, 16              // o1 o2 o0 0
        pshufw mm4, mm2, 01010010b // o3 o3 o5 o4
        pextrw ecx, mm4, 3
        pinsrw mm1, ecx, 0         // o1 o2 o0 o3
        pshufw mm3, mm1, 00101101b // o3 o2 o1 o0
        movq [eax], mm3            // save o1, o2, o3, o4
        movd [eax+8], mm4          // save o5, o6
    }
} void fsaidct7_mmx (short in[7], short out[7])
{
    static __int64 xconst1  = 0x357EE25042B4357E;  // f3 -f5 f1 f3
    static __int64 xconst2  = 0x0F39C25B3DA52AA9;  // f6 -f2 f2 f4
    static __int64 xconst3  = 0x1DB0BD4CD557F0C7;  // f5 -f1 -f4 -f6
    static __int64 xconst4  = 0x0000BD4C00001DB0;  // 0 -f1 0 f5
    static __int64 xconst5  = 0x3061D55730610F39;  // f0 -f4 f0 f6
    static __int64 xconst6  = 0x0000357E30613DA5;  // 0 f3 f0 f2
    static __int64 xconst7  = 0x446BBB953061BB95;  // f7 -f7 f0 -f7
    static __int64 rounding = 0x0000400000004000;

__asm {
        mov eax, in
        movq mm0, [eax+2]          // i4 i3 i2 i1
        pshufw mm6, mm0, 00100010b // i1 i3 i1 i3
        pmaddwd mm6, xconst1       // i1*f3-i3*f5    i1*f1+i3*f3
                                   // (b2)           (b1)
        pshufw mm5, mm0, 01110111b // i2 i4 i2 i4
        pmaddwd mm5, xconst2       // i2*f6-i4*f2    i2*f2+i4*f4
                                   // (b5)           (b4)
        pshufw mm4, mm0, 00100111b // i1 i3 i2 i4
        pmaddwd mm4, xconst3       // i1*f5-i3*f1    -i2*f4-i4*f6
                                   // (b3)           (b6)

mov ecx, [eax]             // i1 i0
        movd mm7, [eax+10]         // 0 0 i6 i5
        mov eax, out
        pinsrw mm7, ecx, 3         // i0 0 i6 i5
        pshufw mm3, mm7, 00000000b // i5 i5 i5 i5
        pmaddwd mm3, xconst4
        paddd mm3, mm6             // mm3 = b2 << 15     b1 << 15 pshufw mm2, mm7, 11011101b // i0 i6 i0 i6
        pmaddwd mm2, xconst5
        paddd mm2, mm5             // mm2 = b5 << 15     b4 << 15 pshufw mm1, mm7, 00001101b // i5 i5 i0 i6
        pmaddwd mm1, xconst6
        paddd mm1, mm4             // mm1 = b3 << 15     b6 << 15 pshufw mm4, mm7, 10101101b // 0 0 i0 i6
        movq mm7, rounding
        pshufw mm5, mm0, 11111101b // x x i4 i2
        psllq mm5, 32
        paddd mm4, mm5             // i4 i2 i0 i6
        pmaddwd mm4, xconst7
        pshufw mm5, mm4, 00001110b // x x i4 i2
        paddd mm4, mm5             // x o3 << 15 movq mm5, mm2
        paddd mm5, mm3             // mm5 = o1 << 15     o0 << 15
```

```
    psubd mm2, mm3              // mm2 = o5 << 15      o6 << 15 pshufw mm3, mm1, 00001110b  // x b3 << 15
    movq mm6, mm1
    paddd mm1, mm3              // x o2 << 15
    psubd mm6, mm3              // mm6 = x o4 << 15 psllq mm4, 32
    psllq mm1, 32
    psrlq mm1, 32
    paddd mm1, mm4              // mm1 = o3 << 15      o2 << 15 paddd mm1, mm7              // do proper rounding
    paddd mm2, mm7
    paddd mm5, mm7
    paddd mm6, mm7
    psrad mm1, 15
    psrad mm2, 15
    psrad mm5, 15
    psrad mm6, 15 packssdw mm5, mm1           // o3 o2 o1 o0
    packssdw mm2, mm6           // x o4 o5 o6
    pshufw mm3, mm2, 00010010b  // o6 o5 x o4 movq [eax], mm5             // store o0, o1, o2, o3
    movd [eax+8], mm3           // store o4
    psrlq mm3, 32
    movd [eax+10], mm3          // store o5, o6
  }
} void fsaidct8_mmx (short in[8], short out[8])
{
    static __int64 xconst1 = 0x0C7C3EC5C13B0C7C; // f7 f1 -f1 f7
    static __int64 xconst2 = 0x238E35363536DC72; // f5 f3 f3 -f5
    static __int64 xconst3 = 0x2D41D2BF2D412D41; // f4 -f4 f4 f4
    static __int64 xconst4 = 0x3B20187D187DC4E0; // f2 f6 f6 -f2
    static __int64 xconst5 = 0x00005A8200005A82; // 0 f0 0 f0
    static __int64 rounding = 0x0000400000004000;

__asm {
        mov eax, in
        movq mm0, [eax]             // i3 i2 i1 i0
        movq mm1, [eax+8]           // i7 i6 i5 i4
        mov eax, out
        pshufw mm2, mm0, 10001101b  // i2 i0 i3 i1
        pshufw mm3, mm1, 00100111b  // i4 i6 i5 i7
        movq mm1, mm2
        punpcklwd mm2, mm3          // i5 i3 i7 i1
        punpckhwd mm1, mm3          // i4 i2 i6 i0 pshufw mm3, mm2, 01000100b  // i7 i1 i7 i1
        pmaddwd mm3, xconst1        // b3[1] b3[0]
        pshufw mm4, mm2, 11101110b  // i5 i3 i5 i3
        pmaddwd mm4, xconst2        // b3[3] b3[2]

pshufw mm0, mm1, 00110011b  // i0 i4 i0 i4
        pmaddwd mm0, xconst3        // mm0 = b1      b0 (*A)
        pshufw mm2, mm1, 10011001b  // i2 i6 i2 i6
        pmaddwd mm2, xconst4
        pshufw mm5, mm2, 01001110b  // mm5 = b2      b3 (*A)
```

```
movq mm1, mm3
psubd mm3, mm4           // b6 << 15      b5 << 15
movq mm7, mm3
punpckhdq mm7, mm6       //    x          b6 << 15
movq mm2, mm7
paddd mm7, mm3           //    x          b[6] + b[5]
psubd mm2, mm3           //    x          b[6] - b[5]
punpckldq mm2, mm7       // b6+b5  b6-b5
movq mm7, rounding
paddd mm2, mm7
psrad mm2, 15 paddd mm1, mm4           // b2[7]   b2[4]

movq mm4, mm0
paddd mm0, mm5           // mm0 = b2[1]   b2[0]  (*C)
psubd mm4, mm5
pshufw mm6, mm4, 01001110b    // mm6 = b2[3]   b2[2]  (*C)

pmaddwd mm2, xconst5     // b2[6]   b2[5]

movq mm5, mm2
punpckldq mm2, mm1       // mm2 = b2[4]   b2[5]  (*C)
punpckhdq mm1, mm5       // mm1 = b2[6]   b2[7]  (*C)

movq mm3, mm0
paddd mm0, mm1           // o1 << 15      o0 << 15
psubd mm3, mm1           // o6 << 15      o7 << 15
movq mm5, mm6
paddd mm6, mm2           // o3 << 15      o2 << 15
psubd mm5, mm2           // o4 << 15      o5 << 15 paddd mm0, mm7           // do proper rounding
paddd mm3, mm7
paddd mm6, mm7
paddd mm5, mm7
psrad mm0, 15
psrad mm3, 15
psrad mm6, 15
psrad mm5, 15 packssdw mm0, mm6        // o3 o2 o1 o0
packssdw mm3, mm5        // o4 o5 o6 o7
pshufw mm1, mm3, 00011011b    // o7 o6 o5 o4
movq [eax], mm0
movq [eax+8], mm1
}
}
```

What is claimed is:

1. A machine-implemented method, comprising:
receiving a multimedia signal having data values;
forming the data values into a matrix of inputs X;
forming a matrix A of predetermined values and multiplication operations;
factoring the matrix A into a butterfly matrix B, a shuffle matrix S, and a multiplication matrix M, wherein the multiplication operations are selectively positioned into pairs within the matrix M, and wherein the values within the matrices B and S are integers selected from the group consisting of 1, 0, and −1;
executing a Single Instruction Multiple Data (SIMD) instruction that multiplies the matrices X, B, S, and M together to obtain a matrix of outputs; and
generating a compressed multimedia signal based on the obtained output matrix Y.

2. The machine-implemented method of claim 1, wherein the SIMD instruction is a Packed Multiply and Add (PMADDWD) instruction.

3. The machine-implemented method of claim 1, wherein the matrix A is a 4-point Discrete Cosine Transform (DCT) transformation matrix, the matrix X represents a time domain of a video signal, and the matrix A represents a frequency domain of the video signal.

4. The machine-implemented method of claim 3, wherein the multiplication matrix M is $$\begin{bmatrix} \frac{1}{\sqrt{2}} & \frac{1}{\sqrt{2}} & 0 & 0 \\ \frac{1}{\sqrt{2}} & -\frac{1}{\sqrt{2}} & 0 & 0 \\ 0 & 0 & \cos\left(\frac{3\pi}{8}\right) & \cos\left(\frac{\pi}{8}\right) \\ 0 & 0 & -\cos\left(\frac{\pi}{8}\right) & \cos\left(\frac{3\pi}{8}\right) \end{bmatrix},$$

and wherein the positioned pairs are $$\frac{1}{\sqrt{2}} \quad \frac{1}{\sqrt{2}} \quad \text{and} \quad \frac{1}{\sqrt{2}} \quad -\frac{1}{\sqrt{2}}.$$

5. The method of claim 1, wherein the butterfly matrix B is of the form $$\begin{bmatrix} 1 & 0 & 0 & 1 \\ 0 & 1 & 1 & 0 \\ 0 & 1 & -1 & 0 \\ 1 & 0 & 0 & -1 \end{bmatrix}.$$

6. A machine-readable medium having instructions to cause a machine to perform a machine-implemented method, comprising:
receiving a multimedia signal having data values;
forming the data values into a matrix of inputs X;
forming a matrix A of predetermined values and multiplication operations;
factoring the matrix A into a butterfly matrix B, a shuffle matrix S, and a multiplication matrix M, wherein the multiplication operations are selectively positioned into pairs within the matrix M, and wherein the values within the matrices B and S are integers selected from the group consisting of 1, 0, and −1;
executing a Single Instruction Multiple Data (SIMD) instruction that multiplies the matrices X, B, S, and M together to obtain a matrix of outputs; and
generating a compressed multimedia signal based on the obtained output matrix Y.

7. The machine-readable medium of claim 6, wherein the SIMD instruction is a Packed Multiply and Add (PMADDWD) instruction.

8. The machine-readable medium of claim 6, wherein the matrix A is a 4-point Discrete Cosine Transform (DCT) transformation matrix, the matrix X represents a time domain of a video signal, and the matrix A represents a frequency domain of the video signal.

9. The machine-readable medium of claim 8, wherein the multiplication matrix M is $$\begin{bmatrix} \frac{1}{\sqrt{2}} & \frac{1}{\sqrt{2}} & 0 & 0 \\ \frac{1}{\sqrt{2}} & -\frac{1}{\sqrt{2}} & 0 & 0 \\ 0 & 0 & \cos\left(\frac{3\pi}{8}\right) & \cos\left(\frac{\pi}{8}\right) \\ 0 & 0 & -\cos\left(\frac{\pi}{8}\right) & \cos\left(\frac{3\pi}{8}\right) \end{bmatrix},$$

and wherein the positioned pairs are $$\frac{1}{\sqrt{2}} \quad \frac{1}{\sqrt{2}} \quad \text{and} \quad \frac{1}{\sqrt{2}} \quad -\frac{1}{\sqrt{2}}.$$

10. The machine-readable medium of claim 6, wherein the butterfly matrix B is of the form $$\begin{bmatrix} 1 & 0 & 0 & 1 \\ 0 & 1 & 1 & 0 \\ 0 & 1 & -1 & 0 \\ 1 & 0 & 0 & -1 \end{bmatrix}.$$

11. A system comprising:

a processing unit coupled to a memory through a bus; and a process executed from the memory by the processing unit to cause the processing unit to:

receive a multimedia signal having data values;

form the data values into a matrix of inputs X;

form a matrix A of predetermined values and multiplication operations;

factor the matrix A into a butterfly matrix B, a shuffle matrix S, and a multiplication matrix M, wherein the multiplication operations are selectively positioned into pairs within the matrix M, and wherein the values within the matrices B and S are integers selected from the group consisting of 1, 0, and −1;

execute a Single Instruction Multiple Data (SIMD) instruction that multiplies the matrices X, B, S, and M together to obtain a matrix of outputs; and generate a compressed multimedia signal based on the obtained output matrix Y.

12. The system of claim 11, wherein the SIMD instruction is a Packed Multiply and Add (PMADDWD) instruction.

13. The system of claim 11, wherein the matrix A is a 4-point Discrete Cosine Transform (DCT) transformation matrix, the matrix X represents a time domain of a video signal, and the matrix A represents a frequency domain of the video signal.

14. The system of claim 13, wherein the multiplication matrix M is $$\begin{bmatrix} \frac{1}{\sqrt{2}} & \frac{1}{\sqrt{2}} & 0 & 0 \\ \frac{1}{\sqrt{2}} & -\frac{1}{\sqrt{2}} & 0 & 0 \\ 0 & 0 & \cos\left(\frac{3\pi}{8}\right) & \cos\left(\frac{\pi}{8}\right) \\ 0 & 0 & -\cos\left(\frac{\pi}{8}\right) & \cos\left(\frac{3\pi}{8}\right) \end{bmatrix},$$

and wherein the positioned pairs are $$\frac{1}{\sqrt{2}} \quad \frac{1}{\sqrt{2}}$$
and
$$\frac{1}{\sqrt{2}} \quad -\frac{1}{\sqrt{2}}.$$

15. The system of claim 11, wherein the butterfly matrix B is of the form $$\begin{bmatrix} 1 & 0 & 0 & 1 \\ 0 & 1 & 1 & 0 \\ 0 & 1 & -1 & 0 \\ 1 & 0 & 0 & -1 \end{bmatrix}.$$

* * * * *